April 30, 1957

W. R. KOCH 2,790,848

FREQUENCY CONTROL SYSTEM

Filed July 31, 1952

INVENTOR.
Winfield R. Koch
BY Otto V. Mitchell
ATTORNEY 2,790,848

FREQUENCY CONTROL SYSTEM

Winfield R. Koch, Marlton, N. J., assignor to Radio Corporation of America, a corporation of Delaware Application July 31, 1952, Serial No. 301,921

2 Claims. (Cl. 178—5.4)

Figures 1, 2:
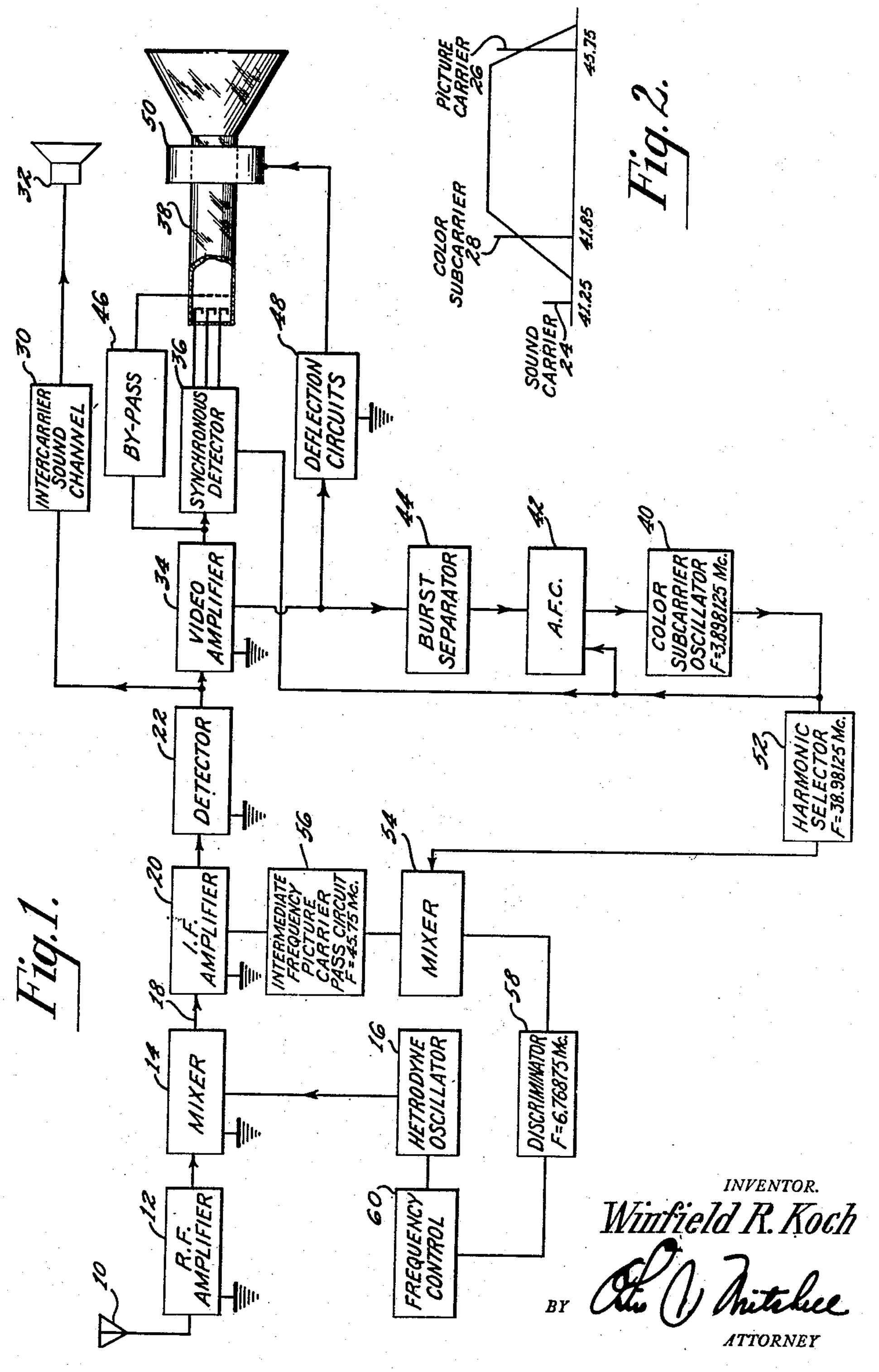

The present invention relates to improvements in frequency control systems, and more particularly, although not necessarily exclusively, to improvements in automatic frequency control of the first detector heterodyne oscillator in color television receiving systems.

In color television receiving systems based upon the color sub-carrier system, a sub-carrier located in the video band near its upper frequency limit is frequency modulated in accordance with color and amplitude modulated in accordance with the degree of color saturation. This color modulated sub-carrier is combined with a brightness signal which is in many respects similar to the presently standard black and white television signal and broadcast.

In such a system it is particularly important that the tuning of the receiver be of a high order of accuracy and stability. This is necessary since the color sub-carrier frequency must always occupy the same region in the selectivity curve of the television receiver I. F. amplifier to keep the correct relative phase and amplitude of the sub-carrier with respect to the brightness information accompanying the sub-carrier.

Since the color sub-carrier is only a fraction of a megacycle away from the sound carrier, it is expedient that the color sub-carrier ride between 50 and 75 percent of the total I. F. response along the slope of the I. F. characteristic toward the higher frequency picture component thereof. It is the color sub-carrier which defines the frequency and phase of the sampling in the color television receiver and hence the exact times at which the red, green or blue color reproducing means are provided with video signal. Thus, any shift in the phase or amplitude of the color sub-carrier, due to a change in its position wherein the I. F. characteristic of the television receiver will cause a noticeable change in the quality of the color television image.

In color television receivers, where an inter-carrier sound system is used, it is difficult to extract datum information from the arriving signal with which to control the frequency of the heterodyne oscillator in the first detector.

In accordance with the present invention there is provided simple means for providing accurate control of the heterodyne oscillator frequency with respect to a standard frequency established by the color sub-carrier oscillator in the color television receiver. The present invention contemplates the extraction of a harmonic of the color sub-carrier oscillator which harmonic is mixed with the intermediate frequency version of the picture carrier. This mixing can be arranged to produce a beat frequency of five or six mc. which may be applied to a rather stable frequency discriminator circuit, the output of which may be used to directly control the frequency of the first detector heterodyne oscillator. It is, therefore, the purpose of the present invention to provide an improved receiving system for color television signals of the color sub-carrier variety.

It is an object of the present invention to provide an improved automatic frequency control circuit for the first detector heterodyne oscillator of a color television receiver. It is a further object of the present invention to provide novel means for extracting automatic frequency control information from a composite sound and color television signal of the color sub-carrier variety.

Other objects and features of the present invention will become apparent through reading of the following specification, especially when taken in connection with the accompanying drawings in which Fig. 1 is a block diagram showing one form of the present invention.

Fig. 2 is a graphic representation of the intermediate frequency version of the elements comprising a composite sound and picture color television signal.

Turning now in detail to Fig. 1, there is shown at 10, a television antenna adapted to feed an R. F. amplifier 12, the output of the amplifier 12 is applied to a conventional mixer circuit 14, adapted to mix the incoming radio signal with the output of a heterodyne oscillator 16. By this signal mixing means, elements comprising the radio frequency signal are given intermediate frequency counterparts, which appear at the output terminal 18 of the mixer 14. The intermediate frequency signal is then applied to an intermediate or I. F. amplifier 20, whose output is conventionally applied to a signal detector 22. At the output of the signal detector 22 in Fig. 1 there will exist several types of signal based upon the elements shown in Fig. 2 which make up the composite sound-television signal.

The exact frequency values of the elements shown in Fig. 2 are based upon what is currently known as a 40 mc. I. F. strip for the television receiver.

In a 40 mc. I. F. system, the sound carrier 24 is assigned a frequency of approximately 41.25 mc. while the picture carrier 26 will assume a frequency of about 45.75 mc. The color sub-carrier 28, on the other hand, will assume a frequency of about 41.85 mc. Thus, at the output of the detector 22 there will exist the 4.5 mc. beat frequency difference between the sound carrier 24 and the picture carrier 26, as well as the beat frequency between the sound carrier and the color sub-carrier. There will also exist the beat frequency between the picture carrier and the color sub-carrier. The 4.5 mc. inter-carrier sound beat is applied to an inter-carrier sound channel 30, which feeds the sound reproducer 32. For details on an inter-carrier sound system, see an article entitled "Design Factor for Inter-Carrier Television Sound" by S. W. Seely, appearing in the July 1948 issue of "Electronics."

The picture carrier and color sub-carrier applied to the video amplifier 34 is then fed to a synchronous detector circuit 36, which feeds video information to the three color guns of the color kinescope 38.

Details of a suitable color kinescope are given in an article entitled "Three Gun Shadow Mask Color Kinescope" by H. B. Law, appearing on pages 1186 through 1194 in the October 1951 issue of the "I. R. E. Proceedings."

The synchronous detector 36 is operated at the color sub-carrier frequency by means of the color sub-carrier oscillator 40. The color sub-carrier oscillator 40 is maintained at the proper phase or frequency relation to the arriving sub-carrier 28 by means of the automatic frequency control circuit 42 which compares the frequency of the sub-carrier oscillator 40 which the frequency of the burst component of the television signal delivered by burst separator 44. Details of the burst component, its significance and means for separation are discussed in an article entitled "Principles of N. T. S. C. Compatible Color Television" published in "Electronics" for February 1952.

High definition picture information is by-passed around the synchronous detector 36 by means of the by-pass filter circuits 46. This technique is also described in the article referred to immediately above.

Deflection synchronizing information is also taken from the video amplifier 34 and applied for the control of suitable deflection circuits 48, whose outputs are applied to the deflection yoke 50.

In accordance with the present invention, a harmonic of the color sub-carrier oscillator 40 is selected by means of a harmonic selection circuit 52. For purposes of convenience the tenth harmonic of the color subcarrier oscillator has been chosen since the color sub-carrier, is established at 3.898125 mc. the tenth harmonic of which is 38.98125 mc. For convenience of description operating frequencies will be expressed to their nearest one-hundredth of a megacycle. This tenth harmonic is fed to a conventional mixer circuit 54 for mixing with the intermediate frequency version of the picture carrier. The mixer circuit 54 may be of the type used in the development of superheterodyne signals in superheterodyne receiving systems. Any signal combining system having non-linear characteristics will, of course, produce the desired difference frequency between the output signal of the harmonic selector 52 and the output signal of the intermediate frequency carrier pass circuit 56. As shown in Fig. 2, the picture carrier falls at approximately 45.75 mc. A suitable filter circuit 56 which passes 45.75 mc. is provided between the intermediate frequency amplifier 20 and the mixer 54.

In accordance with the present invention, the difference frequency of 6.77 mc. between the color sub-carrier oscillator harmonic 38.98 mc. and the intermediate frequency of the picture carrier 45.75 is used for control of the heterodyne oscillator 16 of the television receiving system. This difference frequency (of 6.77 mc.) is applied to the discriminator circuit 58 at the output of mixer 54. The discriminator 58 is tuned to 6.77 mc. so that should the intermediate frequency of the picture carrier shift due to the change in the heterodyne oscillator 16, a corrective voltage will appear at the output of the discriminator 58. This corrective voltage developed by discriminator 58 is applied to frequency control 60, which responds to correct the frequency of the heterodyne oscillator 16.

Suitable circuitry for inclusion in the blocks shown in the figure and discussed above as well as throughout this entire specification are well known in the art and are to be found in the literature, for example, in the "Radio Electronics Magazine" for November 1950, pages 34–6, under the title of "Radio Set and Service Review" and also in the "RCA Review" of March 1947, on pages 5 through 28 thereof. For example, in the above "RCA Review" article there is shown in Figure 11 thereof, a reactance tube frequency control circuit employing a 6 A. C. 7 type tube which may well be employed for the frequency control unit 60. The discriminator 58 may be of any conventional form, as for example, illustrated in connection with the output circuit of the tube V–106 for the circuitry shown in Figure 11.

It is one of the features of the present invention that through the novel heterodyning employed, the rather low control frequency of 6.76 mc. makes possible the construction of much more stable discriminator circuits than would be possible at higher frequencies. This permits much more accurate control of the heterodyne oscillator than would a discriminatory circuit adapted to respond to a control signal of much higher frequency.

Therefore, it will be seen that the present invention provides a novel automatic frequency control system for color television receiving arrangements. Although specific values of frequency have been used in order to make the description of the invention more lucid, it is to be understood that the successful practice of the present invention is in no way limited to the specific values employed.

It will further be seen that the present invention is in no way limited to the specific methods by which the color television signal is processed to derive color information therefrom other than it does rely upon the employment of a color sub-carrier oscillator or the equivalent.

What is claimed is:

1. In a color television receiver for receiving a television radio carrier modulated by a standard composite color television signal which includes a color modulated subcarrier component, and a burst color synchronizing component, said burst component and color subcarrier component being nominally represented by signals of the same frequency displaced from said radio carrier frequency by a fixed amount, the combination of: input terminal means for accepting a radio carrier signal of the type described; a superheterodyne detector means including a beat oscillator operatively coupled with said input terminal means for converting said radio carrier signal into an intermediate frequency picture carrier bearing corresponding composite color television signal modulation, said picture carrier and subcarrier component representations being delivered at discrete intermediate frequencies which are a direct function of the operating frequency of said beat oscillator but separated from one another by said fixed frequency amount, said oscillator being inherently subject to undesired variations in operating frequency which produces undesired variations in the values of intermediate frequencies delivered by said superheterodyne detector means; an intermediate frequency amplifier having a frequency selectivity curve upon which said color subcarrier component is to be maintained at a discrete position and hence at a discrete desired intermediate frequency; filter means operatively coupled with said intermediate amplifier passing substantially only signal frequencies assumed by said intermediate frequency picture carrier component as said oscillator undergoes said undesired variations in frequency; burst extracting means coupled with the output of said intermediate frequency amplifier for extracting from said received signal a demodulated version of said burst color synchronizing component; a color subcarrier oscillator operative at substantially the burst color synchronizing component frequency and productive of harmonics thereof; automatic frequency control means operatively coupled with said burst extracting means and said subcarrier oscillator maintaining the operating frequency of said subcarrier oscillator at the value defined by said burst component; a harmonic selector network operatively coupled with said color subcarrier oscillator for selecting a harmonic of said color subcarrier oscillator frequency; a mixer circuit means operatively coupled with both said harmonic selector circuit and said filter means for heterodyning said selected oscillator harmonic with the intermediate frequency picture carrier to produce a control beat signal, the frequency value of which varies with said undesired changes in said superheterodyne detector beat oscillator; a frequency discriminator circuit operatively coupled with the output of said mixer circuit responsive to changes in the frequency value of said control beat signal to produce an automatic frequency control signal; and means operatively coupled with said heterodyne beat oscillator and said discriminator circuit for operatively stabilizing said beat oscillator frequency in response to said automatic frequency control signal.

2. In a color television receiver for receiving a television radio carrier modulated by a standard composite color television signal which includes a color modulated subcarrier component, and a burst color synchronizing component, said burst component and color subcarrier component being nominally represented by signals of the same frequency displaced from said radio carrier frequency by a fixed amount, the combination of: input terminal means for accepting a radio carrier signal of the type described; a superheterodyne detector means including a beat oscillator operatively coupled with said input terminal means for converting said radio carrier signal into an intermediate frequency picture carrier bearing corresponding composite color television signal modulation, said picture carrier and subcarrier component representations being delivered at discrete intermediate frequencies which are a direct function of the operating frequency of said beat oscillator but separated from one another by said fixed frequency amount, said oscillator being inherently subject to undesired variations in operating frequency which produces undesired variations in the values of intermediate frequencies delivered by said superheterodyne detector means; an intermediate frequency amplifier having a frequency selectivity curve upon which said color subcarrier component is to be maintained at a discrete position and hence at a discrete desired intermediate frequency; filter means operatively coupled with said intermediate amplifier passing substantially only signal frequencies assumed by said intermediate frequency picture carrier component as said oscillator undergoes said undesired variations in frequency; signal demodulation means operatively coupled with the output of said intermediate frequency amplifier to produce a demodulated composite color television signal of the type described; means operatively coupled with said demodulation means for extracting from said color television signal said burst color synchronizing component; a color subcarrier oscillator operative at substantially the frequency of said color subcarrier component and productive of harmonics thereof; an automatic frequency control circuit operatively coupled to said subcarrier oscillator, said burst extracting means maintaining the operating frequency of said subcarrier oscillator at the frequency of said burst component and hence said color subcarrier component; means operatively coupled with said subcarrier oscillator responsive to the signal delivered by said subcarrier oscillator to produce a continuous reference signal harmonically related to the frequency of said subcarrier oscillator; an electronic mixer circuit operatively coupled with both said reference signal producing means and said filter means for heterodyning said reference signal with said intermediate frequency picture carrier to produce a control beat signal, the frequency value of which varies with said undesired changes in the frequency of said superheterodyne detector beat oscillator; a frequency discriminator circuit operatively coupled with the output of said mixer circuit responsive to changes in the frequency value of said control beat signal to produce an automatic frequency control signal; and means operatively coupled with said heterodyne beat oscillator and said discriminator circuit for operatively correcting unwanted variations in the frequency of said heterodyne beat oscillator to maintain said color subcarrier intermediate frequency signal representation at said desired discrete position on said intermediate frequency amplfier frequency selectivity curve.

References Cited in the file of this patent

UNITED STATES PATENTS

| | | |
|---|---|---|
| 2,169,883 | Paffrath | Aug. 15, 1939 |
| 2,369,663 | Dennis et al. | Feb. 20, 1945 |
| 2,410,817 | Gintzon et al. | Nov. 12, 1946 |
| 2,589,387 | Hugenholtz | Mar. 18, 1952 |
| 2,677,049 | Rogers | Apr. 27, 1954 |
| 2,714,132 | Fredendall | July 26, 1955 |